(12) United States Patent
Mita

(10) Patent No.: US 9,273,557 B2
(45) Date of Patent: Mar. 1, 2016

(54) MOTOR DEVICE

(75) Inventor: Masahiro Mita, Takasaki (JP)

(73) Assignee: Hitachi Metals, Ltd., Tokyo (JP)

( * ) Notice: Subject to any disclaimer, the term of this patent is extended or adjusted under 35 U.S.C. 154(b) by 411 days.

(21) Appl. No.: 13/983,744

(22) PCT Filed: Feb. 2, 2012

(86) PCT No.: PCT/JP2012/052337
§ 371 (c)(1),
(2), (4) Date: Aug. 5, 2013

(87) PCT Pub. No.: WO2012/111440
PCT Pub. Date: Aug. 23, 2012

(65) Prior Publication Data
US 2013/0315705 A1    Nov. 28, 2013

(30) Foreign Application Priority Data

Feb. 17, 2011 (JP) .................................. 2011-032405

(51) Int. Cl.
| H02K 49/00 | (2006.01) |
| F01D 1/24 | (2006.01) |
| H02K 7/02 | (2006.01) |

(52) U.S. Cl.
CPC .. *F01D 1/24* (2013.01); *H02K 7/02* (2013.01); *Y02E 60/16* (2013.01)

(58) Field of Classification Search
CPC ........................... H02K 49/102; H02K 49/104
USPC ...................................... 310/103, 51, 101, 98
See application file for complete search history.

(56) References Cited

U.S. PATENT DOCUMENTS

| 5,249,784 | A |   | 10/1993 | Murakami et al. |   |
| 5,376,862 | A | * | 12/1994 | Stevens ................ | H02K 49/106 310/103 |
| 5,469,035 | A | * | 11/1995 | Lowrance ................ | B25J 9/107 318/568.1 |
| 2004/0021384 | A1 | * | 2/2004 | Six ........................ | H02K 49/106 310/103 |
| 2008/0150382 | A1 | * | 6/2008 | Yamauchi ................ | B60K 6/26 310/103 |

FOREIGN PATENT DOCUMENTS

| JP | 3-4048 A | 1/1991 |
| WO | WO 2009/087408 A2 | 7/2009 |

OTHER PUBLICATIONS

Ikeda et al., "A Way to Improve Efficiency of Permanent-Magnet Magnetic Gears", Journal of the Magnetics Society of Japan, vol. 33, No. 2, pp. 130-134 (2009).
Ikeda et al., "Consideration of Rotor Structure in Permanent-Magnet Magnetic Gears", Journal of the Magnetics Society of Japan, vol. 34, No. 3, pp. 380-384 (2010).

* cited by examiner

*Primary Examiner* — Thanh Lam
(74) *Attorney, Agent, or Firm* — Bret E. Field; Bozicevic, Field & Francis LLP

(57) ABSTRACT

Provided is a motor device capable of suppressing undesired vibrations occurring at the time of starting a motor, by canceling a torque in a motor device system so as to reduce a reaction torque acting on a motor base. The motor device is equipped with a dual axis motor having first and second rotating shafts and projecting at either end, a rotational direction converter having an input shaft to which the torque of the dual axis motor is inputted and an output shaft that outputs the torque by rotating in a direction opposite to that of the input shaft, and a flywheel provided at an end portion of the first rotating shaft, for balancing out the reaction torque acting on the input shaft and the output shaft of the rotational direction converter when the dual axis motor rotates.

14 Claims, 7 Drawing Sheets

MOTOR DEVICE

This application is the national phase under 35 U.S.C. §371 of PCT International application No. PCT/JP2012/052337 which has an International filing date of Feb. 2, 2012 and designated the United States of America.

FIELD

The present invention relates to a motor device which outputs torque to the rotating load and particularly to a motor device that can suppress vibrations due to a reaction torque.

BACKGROUND

A motor is used as a source of power in a precision stage, a semiconductor manufacturing equipment, an outdoor unit of air conditioner, a refrigerator and other different types of appliances. When a motor starts rotating, initial torque is generated at the start up. In a typical motor, the torque is received at the motor base, but the motor base is usually separated from the central axis of rotation. For this reason, when the torque develops at the startup of the motor, a reaction torque centered around the position of mounting of the motor base acts on the motor in addition to its self-rotational torque, and the problem of vibration of the motor arises.

When vibration of the motor is taken into account, the moment can be considered as an integral moment of inertia of the rotor of the motor and the rotating load connected to the rotor. If the torque of the motor is $\tau$, the moment of inertia is $I$ and angular velocity is $\alpha$; then the following equation holds true according to the second law of motion.

$$\tau = I\alpha$$

Thus, for rotating the motor with angular velocity $\alpha$, a torque $\tau$ acts on the rotor and the rotating load of the motor, and a reaction torque-$\tau$ acts on the motor base, where the motor is located. This torque-$\tau$, which acts on the motor base, causes vibration of the motor and the motor base.

For solving this problem, various methods such as increasing the rigidity of the motor base and inserting shock-absorbing materials (see for example, Patent Document 1) have been adopted.

Non-Patent Document 1 has disclosed a magnetic gear mechanism for transferring the torque outputted from the motor.

[Patent Document 1] Japanese Patent Application Laid-Open No. H3-4048

[Non-Patent Document 1] Ikeda Tetsuya, Nakamura Kenji, Ichinokura Osamu 'A Way to Improve Efficiency of Permanent-Magnet Magnetic Gears', Jikigakkai ronbunshi, 2009, Vol. 33, No. 2, Page. 130-134.

SUMMARY

However, the conventional methods of solution cannot completely solve the problem of vibrations of the motor existing in the art, and just try to avoid transferring the vibrations of the motor to other appliances, thus there was the problem of minute vibrations.

The present invention has been devised based on the above circumstances and its object is to provide a motor device capable of suppressing undesired vibrations occurring at the time of starting a motor, by canceling a torque in a motor device system so as to reduce a reaction torque acting on a motor base.

A motor device according to the first aspect is characterized by comprising a dual axis motor having a rotating shaft projecting from both sides; a rotational direction converter that is connected to one end side of the rotating shaft and has an input shaft to which a torque of the dual axis motor is inputted and an output shaft which outputs the torque by rotating in a direction opposite to the direction of rotation of the input shaft; and a flywheel that is provided at the other end side of the rotating shaft or at the output shaft of the rotational direction converter and balances out a reaction torque acting on the input shaft and the output shaft of the rotational direction converter when the dual axis motor rotates.

A motor device according to the second aspect is characterized by comprising a rotating load connected to the output shaft of the rotational direction converter or to the other end side of the rotating shaft, wherein moments of inertia of the flywheel, the dual axis motor, the rotational direction converter and the rotating load and a ratio of the numbers of rotations of the rotational direction converter satisfy an equation below:

$$Ia/Ib = \alpha$$

where,

Ia: sum of the moments of inertia on the input shaft side of the rotational direction converter, Ib: sum of the moments of inertia on the output shaft side of the rotational direction converter, and $\alpha$: ratio of the number of rotations of the output shaft to the number of rotations of the input shaft.

A motor device according to the third aspect is characterized by comprising a dual axis motor having a rotating shaft projecting from both sides; a rotational direction converter that is connected to one end side of the rotating shaft and has an input shaft to which a torque of the dual axis motor is inputted and an output shaft which outputs the torque by rotating in a direction opposite to the direction of rotation of the input shaft; and a flywheel mounting part which is provided at the other end side of the rotating shaft or at the output shaft of the rotational direction converter, and to which a flywheel balancing out a reaction torque acting on the input shaft and the output shaft of the rotational direction converter when the dual axis motor rotates, is to be mounted.

A motor device according to the fourth aspect is characterized by comprising a flywheel mounted to the flywheel mounting part.

A motor device according to the fifth aspect is characterized by comprising a dual axis motor having a rotating shaft projecting from both sides; a rotational direction converter that is connected to one end side of the rotating shaft and has an input shaft to which a torque of the dual axis motor is inputted and an output shaft which outputs the torque by rotating in a direction opposite to the direction of rotation of the input shaft; and a rotating load connected to the output shaft of the rotational direction converter or to the other end side of the rotating shaft;

wherein moments of inertia of the dual axis motor, the rotational direction converter and the rotating load and the ratio of the numbers of rotations of the rotational direction converter satisfy an equation below:

$$Ia/Ib = \alpha$$

where,
Ia: sum of the moments of inertia on the input shaft side of the rotational
direction converter,
Ib: sum of the moments of inertia on the output shaft side of the rotational direction converter, and
α: ratio of the number of rotations of the output shaft to the number of rotations of the input shaft.

A motor device according to the sixth aspect is characterized by comprising a single axis motor having a rotating shaft projecting out; a rotational direction converter that is connected to the rotating shaft and has an input shaft to which a torque of the single axis motor is inputted and an output shaft which outputs the torque by rotating in a direction opposite to the direction of rotation of the input shaft; and a rotating load connected to the output shaft of the rotational direction converter,
wherein moments of inertia of the single axis motor, the rotational direction converter and the rotating load and a ratio of the numbers of rotations of the rotational direction converter satisfy an equation below:

$$Ia/Ib = \alpha$$

where,
Ia: sum of the moments of inertia on the input shaft side of the rotational
direction converter,
Ib: sum of the moments of inertia on the output shaft side of the rotational direction converter, and
α: ratio of the number of rotations of the output shaft to the number of rotations of the input shaft.

A motor device according to the seventh aspect is characterized in that the rotational direction converter has a magnetic gear mechanism that transfers the torque inputted to the input shaft to the output shaft.

A motor device according to the eighth aspect is characterized by comprising a fixing part that fixes the dual axis motor, the single axis motor or the rotational direction converter at an external place of mounting.

In the first and second aspects, the rotational direction converter is provided on one end side of the rotating shaft of the dual axis motor and therefore, when the dual axis motor rotates, the other end side of the rotating shaft of the dual axis motor and the output shaft of the rotational direction converter rotate in the opposite directions. When the dual axis motor rotates, a reaction torque of respectively opposite directions acts on the input shaft side of the rotational direction converter and the output shaft side thereof. The flywheel is provided at the other end side of the rotating shaft or on the output shaft of the rotational direction converter for balancing out the reaction torque acting on the input shaft and the output shaft of the rotational direction converter, when the dual axis motor rotates. Therefore, the overall torque applied on the motor device gets cancelled and thus there is no torque that can vibrate the motor device at the time of starting the motor.

In the third and fourth aspects, it is possible to appropriately mount the flywheel in accordance with the rotating load by means of the flywheel mounting part provided.

According to the fifth aspect, the rotational direction converter is provided at one end side of the rotating shaft of the dual axis motor and therefore, when the dual axis motor rotates, the other end side of the rotating shaft of the dual axis motor and the output shaft of the rotational direction converter rotate in the opposite directions. When the dual axis motor rotates, a reaction torque of respectively opposite directions acts on the input shaft side of the rotational direction converter and the output shaft side thereof. However, as the reaction torques are of the same magnitude but act in the opposite directions, there is no torque that can vibrate the motor device.

According to the sixth aspect, the rotational direction converter is provided at one end side of the rotating shaft of the single axis motor and therefore, when the single axis motor rotates, the rotating shaft of the single axis motor and the output shaft of the rotational direction converter rotate in the opposite directions. When the single axis motor rotates, a reaction torque of respectively opposite directions acts on the input shaft side of the rotational direction converter and the output shaft side thereof. However, as the reaction torques are of the same magnitude but act in the opposite directions, there is no torque that can vibrate the motor device.

According to the seventh aspect, the rotational direction converter changes the direction of rotation of the input shaft and the output shaft by means of the magnetic gear mechanism and outputs the torque inputted during the input through the output shaft. By providing the magnetic gear mechanism, it is possible to reduce noise and friction as compared to a gear mechanism.

According to the eighth aspect, the motor device can be fixed by means of the fixing part provided on the dual axis motor, the single axis motor or the rotational direction converter.

By virtue of the present invention, undesired vibrations at the time of starting a motor can be suppressed. As a result, vibrations and noise are moderated and for example, abrasion of mechanical elements, such as bearings can also be reduced.

The above and further objects and features will more fully be apparent from the following detailed description with accompanying drawings.

DETAILED DESCRIPTION

The present invention is explained below with reference to the drawings illustrating its various embodiments.

Figure 1:
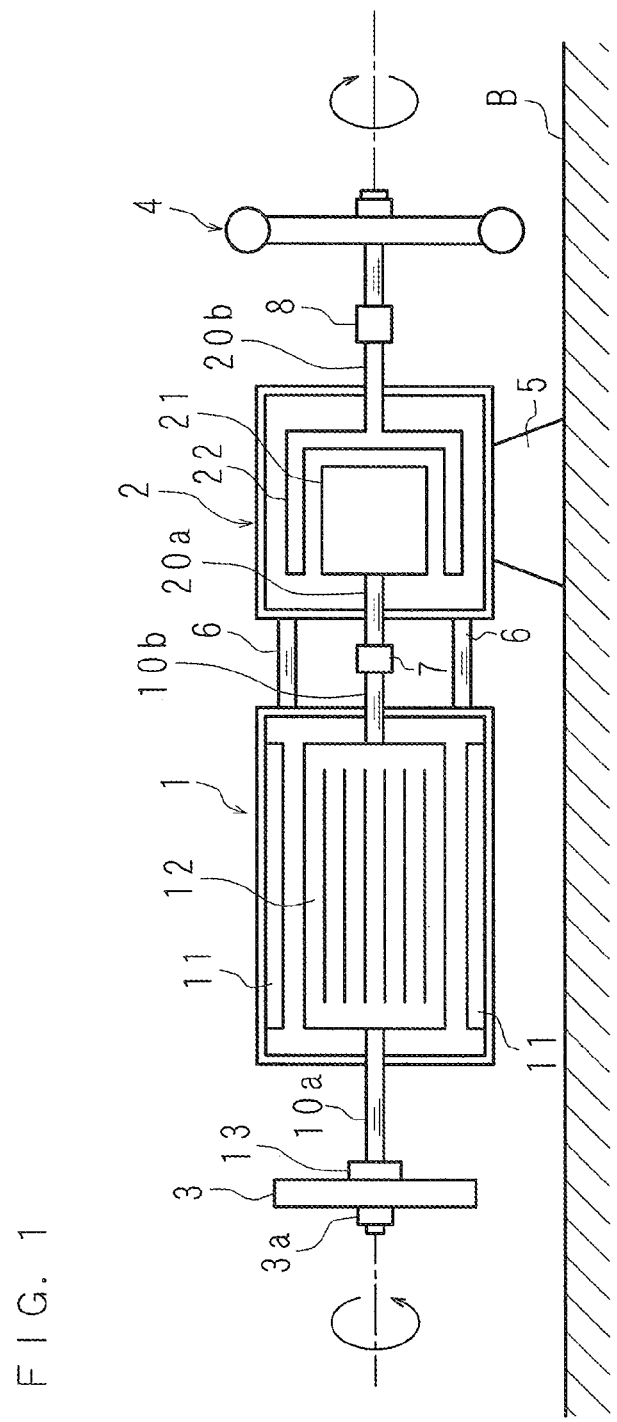
FIG. 1 is a side sectional view illustrating an example of configuration of a motor device according to a present embodiment.

FIG. 1 is a side sectional view illustrating an example of configuration of the motor device according to the present embodiment. The motor device according to the embodiment of the present invention is provided with a dual axis motor 1 having a first rotating shaft 10a and a second rotating shaft 10b projecting from both sides, a rotational direction converter 2 having an input shaft 20a which is connected to the second rotating shaft 10b and to which the torque of the dual axis motor 1 is inputted and an output shaft 20b which outputs the torque by rotating in a direction opposite to that of the input shaft 20a, a flywheel 3 provided on the first rotating shaft 10a which balances out the reaction torque acting on the input shaft 20a and the output shaft 20b of the rotational direction converter 2 when the dual axis motor 1 rotates, and a rotating load 4 connected to the output shaft 20b of the rotational direction converter 2. The motor device according to the present embodiment can be used in a precision stage, a liquid crystal panel production equipment, a semiconductor manufacturing equipment, a component of vehicle, a refrigerator, an air conditioner, and other appliances, but the explanation by assuming a typical motor device with the rotational load 4 is given hereinafter.

The dual axis motor 1 has a substantially cylindrical housing in which a stator 11 is fixed. A rotor 12 having the first rotating shaft 10a and the second rotating shaft 10b that project on either side of the central line of the housing is provided inside the housing. A flywheel mounting part 13 for mounting the flywheel 3 is situated on the first rotating shaft 10a of the dual axis motor 1. The flywheel mounting part 13 is, for example, a flange portion for latching the flywheel 3 inserted on the first rotating shaft 10a. The flange portion is an example of the flywheel mounting part 13, but there is no restriction on its shape, as long as it has a suitable structure for mounting the flywheel 3.

The rotational direction converter 2 includes the input shaft 20a to which the torque of the dual axis motor 1 is inputted, the output shaft 20b that outputs the torque by rotating in a direction opposite to that of the input shaft 20a, and a magnetic gear mechanism that reverses the direction of rotation of the input shaft 20a and the output shaft 20b and is provided with an inner rotor 21 to which the input shaft 20a is connected and an outer rotor 22 to which the output shaft 20b is connected, and it is connected to the dual axis motor 1 by means of a fastener 6, 6. The second rotating shaft 10b of the dual axis motor 1 and the input shaft 20a of the rotational direction converter 2 are connected by means of a shaft coupling 7 and the torque of the dual axis motor 1 is inputted into the rotational direction converter 2. In FIG. 1, the second rotating shaft 10b and the input shaft 20a are shown to be connected by means of the shaft coupling 7, but the second rotating shaft 10b and the input shaft 20a may also have an integrated structure. Details of the magnetic gear mechanism are explained later. Now, in this embodiment, the rotational direction converter 2 that changes the direction of rotation of the dual axis motor 1 by means of a magnetic gear mechanism is explained, but it may have a structure in which the direction of rotation is changed by means of a gear mechanism. The rotating load 4 is connected to the output shaft 20b of the rotational direction converter 2 via a shaft coupling 8.

The flywheel 3, for example, is a circular disc-shaped member having an insertion hole at the center. The flywheel 3 is inserted onto the first rotating shaft 10a of the dual axis motor 1, mounted to the flywheel mounting part 13 and fixed by means of a bolt 3a. There is no specific restriction on the size and material of the flywheel 3, but the shape is preferably such that friction of the rotating flywheel 3 is as low as possible. For canceling the reaction torque acting on the motor device by means of a small flywheel 3, there are various methods, such as using a high density flywheel 3 and selecting its shape in order to increase the moment of inertia, for example by making a thicker outer peripheral portion of the circular disc-shaped flywheel 3.

The moment of inertia of the flywheel 3 for suppressing generation of vibrations of the motor device is determined to satisfy the formula (3) below:

$$Ia \times a = Ib \times b \quad (3)$$

Here, Ia is the sum of the moments of inertia on the input shaft 20a side of the rotational direction converter 2 and Ib is the sum of the moments of inertia on the input shaft 20b side of the rotational direction converter 2. In particular, Ia is the moment of inertia of the rotating portion which includes the flywheel 3, the first and second rotating shafts 10a and 10b, the rotor 12, the shaft coupling 7, the input shaft 20a and the inner rotor 21. Ib is the moment of inertia of the rotating portion which includes the outer rotor 22, the output shaft 20b, the shaft coupling 8 and the rotating load 4.

a and b are the numbers of rotations of the input shaft 20a and the output shaft 20b of the rotational direction converter 2. In other words, the number of rotations of the input shaft 20a: the number of rotations of the output shaft 20b=a:b. In addition, a mentioned in the claims is the ratio of the rotational speed of the output shaft 20b to the rotational speed of the input shaft 20a, that is, b/a.

The motor device has a fixing part 5 for fixing itself to the motor base B. The fixing part 5 is, for example, a member having a side face of almost trapezoidal shape fixed to the rotational direction converter 2 and the bottom surface portion of the fixing part 5 is fixed to the motor base B by bolts etc.

Figure 2:
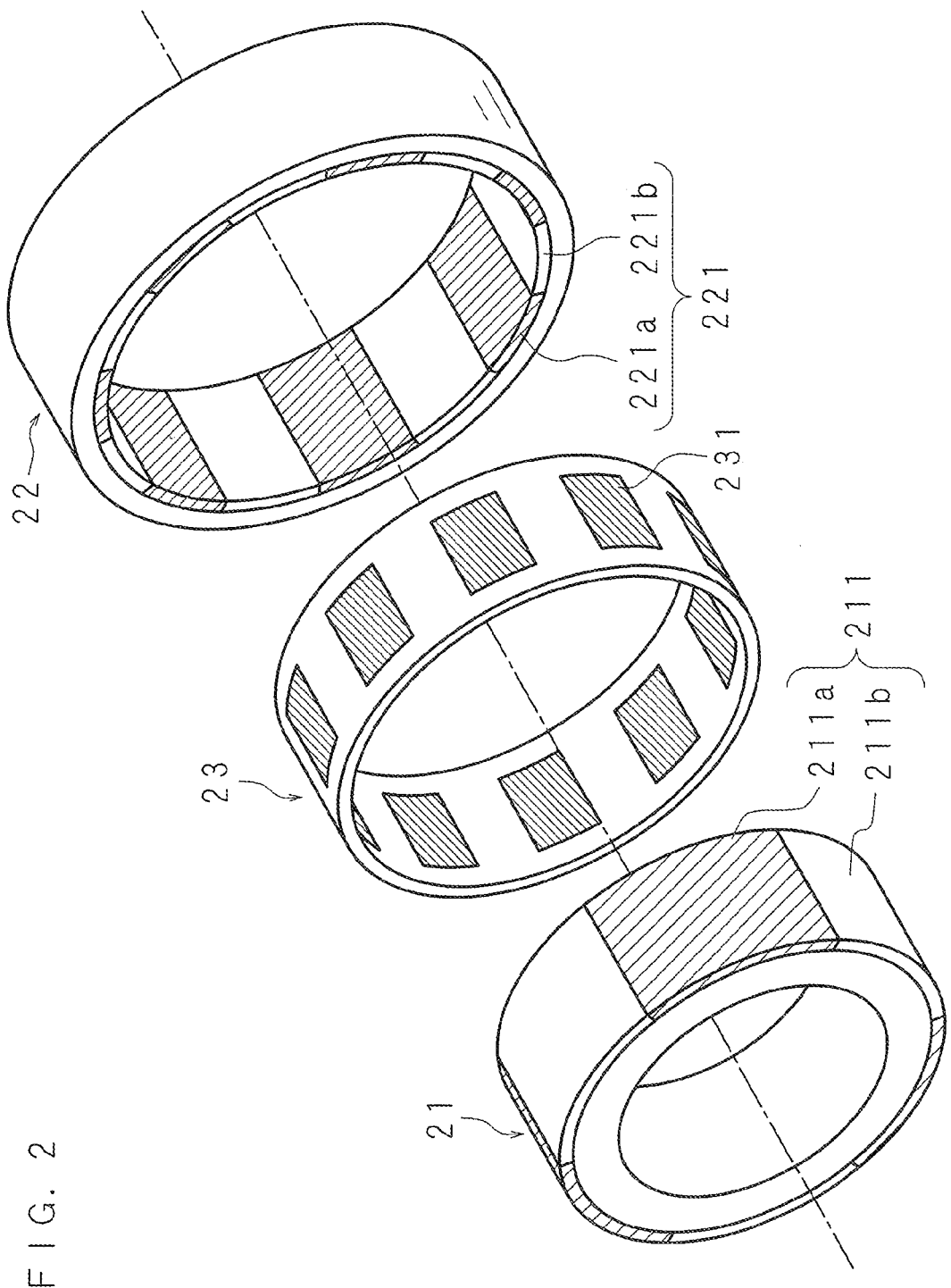
FIG. 2 is an exploded view illustrating an example of assembly of a rotational direction converter.

FIG. 2 is an exploded view illustrating an example of the assembly of the rotational direction converter 2. The rotational direction converter 2 is, for example, an accelerator/reducer having a space harmonic type of magnetic gear mechanism. The rotational direction converter 2 is provided with a cylindrical inner rotor 21, a cylindrical outer rotor 22, which encloses on its inside the inner rotor 21 by maintaining a gap, and an intermediate yoke 23 fitted between the inner rotor 21 and the outer rotor 22 by maintaining a gap from the inner rotor 21 and the outer rotor 22.

On the outer periphery of the inner rotor 21, there are provided 3 pairs of magnetic poles 211 along the peripheral direction, each of which consists of a set of N-pole magnet 211a and S pole 211b magnet on the outer peripheral surface, magnetized in the direction of thickness.

On the inner periphery of the outer rotor 22, there are provided 7 pairs of magnetic poles 221 along the peripheral direction, each of which consists of a set of N-pole magnet 221a and S pole magnet 221b of the inner peripheral surface, magnetized in the direction of thickness. Here, 'magnet magnetized in the direction of thickness' means the magnet with different poles at the outer surface and the inner surface. For example, the magnet 211a is magnetized in such a way that the outer peripheral surface and the inner peripheral surface are N pole and S pole respectively, and the magnet 211b is magnetized in such a way that the outer peripheral surface and the inner peripheral surface are S pole and N pole respectively.

When the outer rotor 22 rotates, the inner rotor 21 rotates due to mutual magnetic interaction between the pairs of magnetic poles 211 and 221 of the inner rotor 21 and the outer rotor 22 respectively. In this case, the inner rotor 21 having lesser number of magnetic poles than the outer rotor 22 rotates at a higher number of rotations than the outer rotor 22 in a direction opposite to that of the outer rotor 22 (see Ikeda Tetsuya, Nakamura Kenji, Ichinokura Osamu 'A Way to Improve Efficiency of Permanent-Magnet Magnetic Gears', Jikigakkai ronbunshi, 2009, vol. 33, No. 2, P. 130-134). The ratio of the number of pairs Ph of the magnets situated on the inner rotor 21 and the number of pairs Pl of magnets situated on the outer rotor 22, that is, Ph/Pl is the gear ratio n of the inner rotor 21 to the outer rotor 22, which is given by n=1/α.

In addition, when the outer rotor 22 rotates through one rotation in the anticlockwise direction, the inner rotor 21 rotates through 1/n rotations in the clockwise direction. In the example of the rotational direction converter 2 shown in FIG. 2, the gear ratio n is 3/7 and, for example, when the outer rotor 22 rotates through one rotation in the anticlockwise direction, the inner rotor 21 rotates through 7/3 rotations in the clockwise direction.

The explanation is given, in which the number of output rotations of the rotational direction converter 2 is lower than the number of input rotations of the rotational direction converter 2 from the dual axis motor 1. The present invention can also be applied in case where the number of output rotations is higher than the number of input rotations.

The intermediate yoke 23 holds ten magnetic bodies 231, which is the sum of the pairs of magnetic poles 211, 221 (that are three and seven respectively) of the inner rotor 21 and the outer rotor 22 along the peripheral direction disposed at equal intervals. The intermediate yoke 23, for example, is made by fixing respective magnetic bodies 231 in a resin molded in a cylindrical shape (for example, see the pamphlet of the International Patent Publication 2009/087408). In the intermediate yoke 23, an alternating magnetic field which contains the 3rd harmonic component, the 7th harmonic component and the 13th harmonic component generated by the pairs of magnetic poles 211 and 221 is intersected along the radial direction. A soft magnetic body like magnetic metal, laminated magnetic plates or compressed magnetic powder may be used as the magnetic body 231.

The function and effect of the motor device constructed in this way will be explained.

Figure 3:
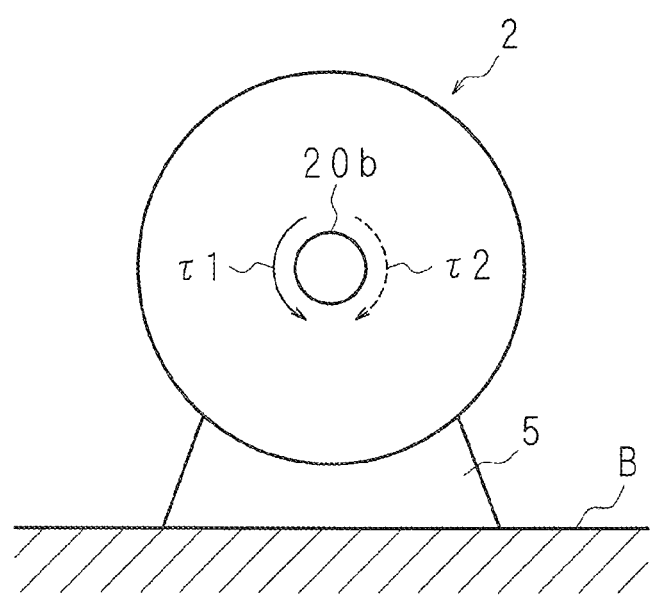
FIG. 3 is a diagram for explaining the function and effect of the motor device according to the present embodiment.

FIG. 3 is a diagram for explaining the function and effect of the motor device according to the present embodiment. When the dual axis motor 1 rotates, a torque is outputted from the first and second rotating shafts 10a and 10b. Particularly, the torque outputted from the second rotating shaft 10b whose direction is converted oppositely by the rotational direction converter 2 is supplied to the rotating load 4. In other words, the part at the side of the input shaft 20a of the rotational direction converter 2 and the part at the side of the output shaft 20b thereof rotate in opposite directions. The torque $\tau 1$ acting on the part at the side of the input shaft 20a of the rotational direction converter 2 and the torque $\tau 2$ acting on the part at the side of the output shaft 20b have the same magnitude, but their directions are opposite to each other. Thus, there is no torque that can vibrate the motor device at the time of starting the motor.

In the motor device according to the present embodiment, undesired vibrations at the time of starting the motor can be suppressed and noise can be prevented. In addition, the torque in the motor device system gets cancelled and therefore, the torque acts on the motor base B and the vibrations of the motor device can be prevented. Moreover, because the structure is such that the vibrations of the motor device are suppressed due to cancellation of the torque acting on the motor device; it is possible to simplify the structure of the joint portion of the motor base B.

Since the space harmonic type of magnetic gear mechanism is used as the rotational direction converter 2, the vibrations, the noise, and the loss of energy due to friction can be reduced in comparison with the use of gear mechanism and, the abrasion of mechanical elements such as bearings can also be reduced.

The space harmonic type of magnetic gear mechanism for the rotational direction converter 2 has been explained in the present embodiment. However, other magnetic gear mechanisms, such as planetary magnetic gear mechanism may also be used in the present invention. Although, the magnetic gear mechanism has been explained here, even non-magnetic gear mechanism that is the torque converter using usual gear mechanism, such as planetary gear mechanism may also be employed in the present invention.

Variant Example 1

Figure 4:
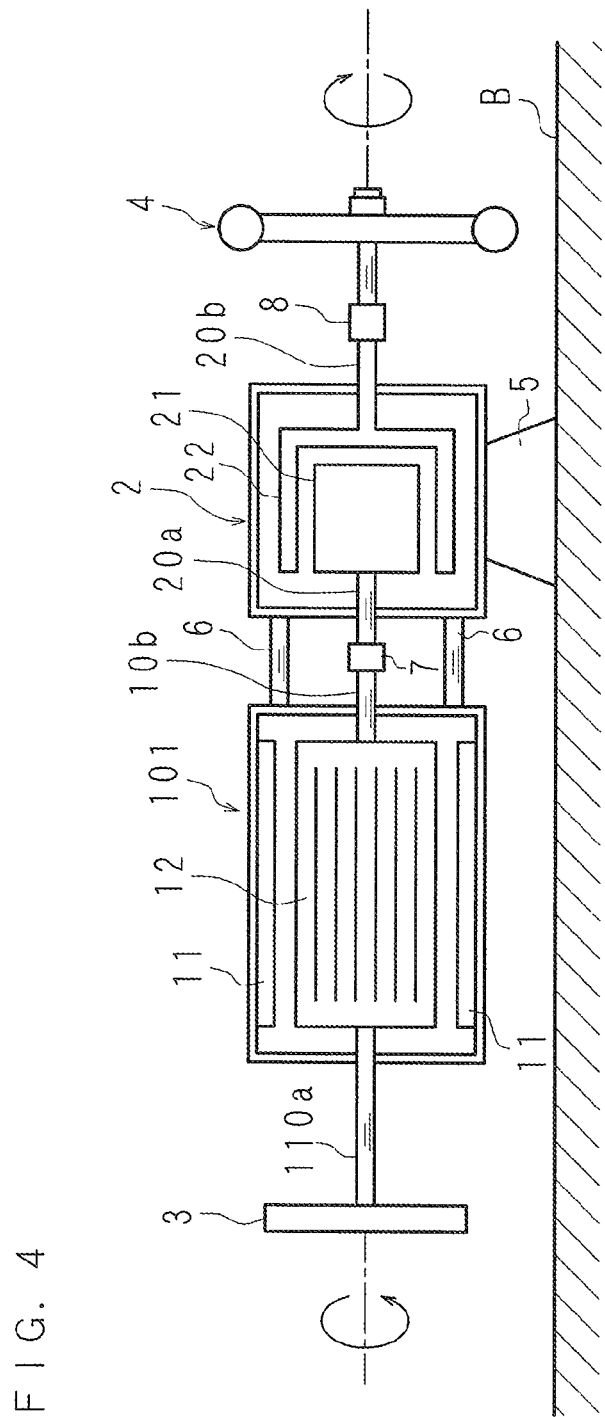
FIG. 4 is a side sectional view illustrating an example of configuration of a motor device according to variant example 1.

FIG. 4 is a side sectional view illustrating an example of configuration of a motor device according to variant example 1. In the embodiment shown in FIG. 1, an example of the dual axis motor 1 having the first rotating shaft 10a provided with the flywheel mounting part 13 and the flywheel 3 mounted to the flywheel mounting part 13 has been explained. However, the flywheel 3 may also be provided in such an integrated manner on a first rotating shaft 110a of a dual axis motor 101, as shown in FIG. 4.

Variant Example 2

Figure 5:
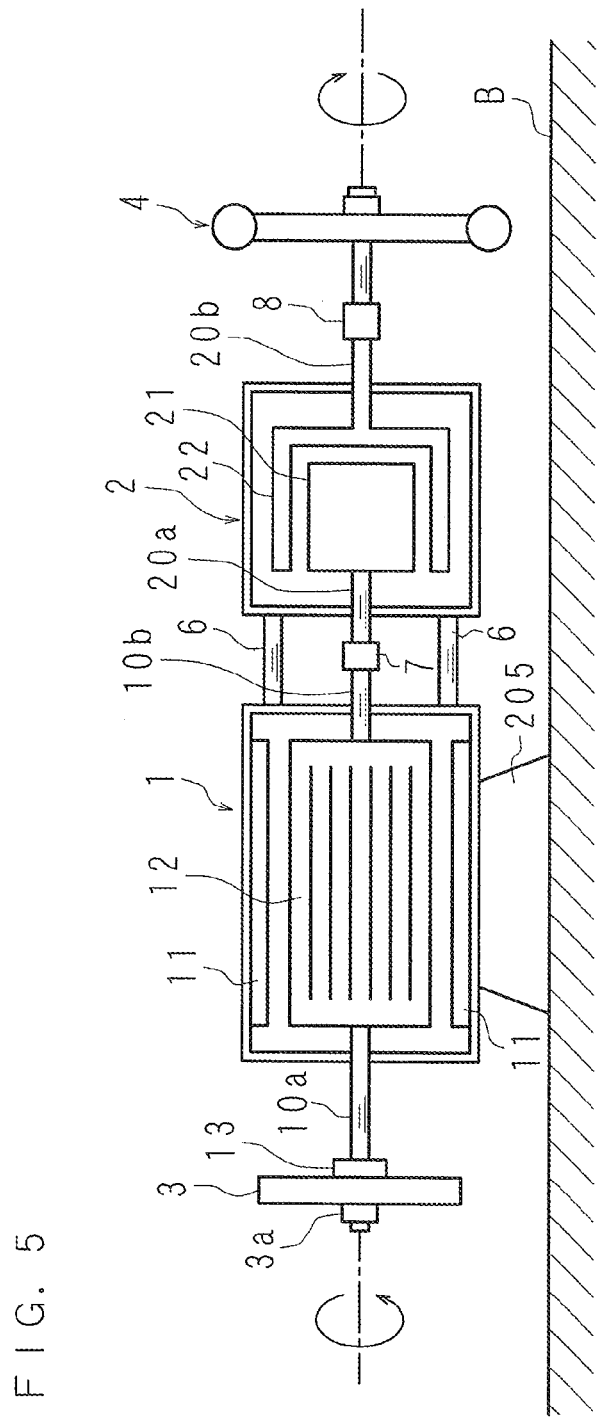
FIG. 5 is a side sectional view illustrating an example of configuration of a motor device according to variant example 2.

FIG. 5 is a side sectional view illustrating an example of configuration of a motor device according to variant example 2. In the embodiment shown in FIG. 1, the fixing part 5 is provided on the rotational direction converter 2. However, a fixing part 205 may also be provided on the dual axis motor 1, as shown in FIG. 5.

Variant Example 3

Figure 6:
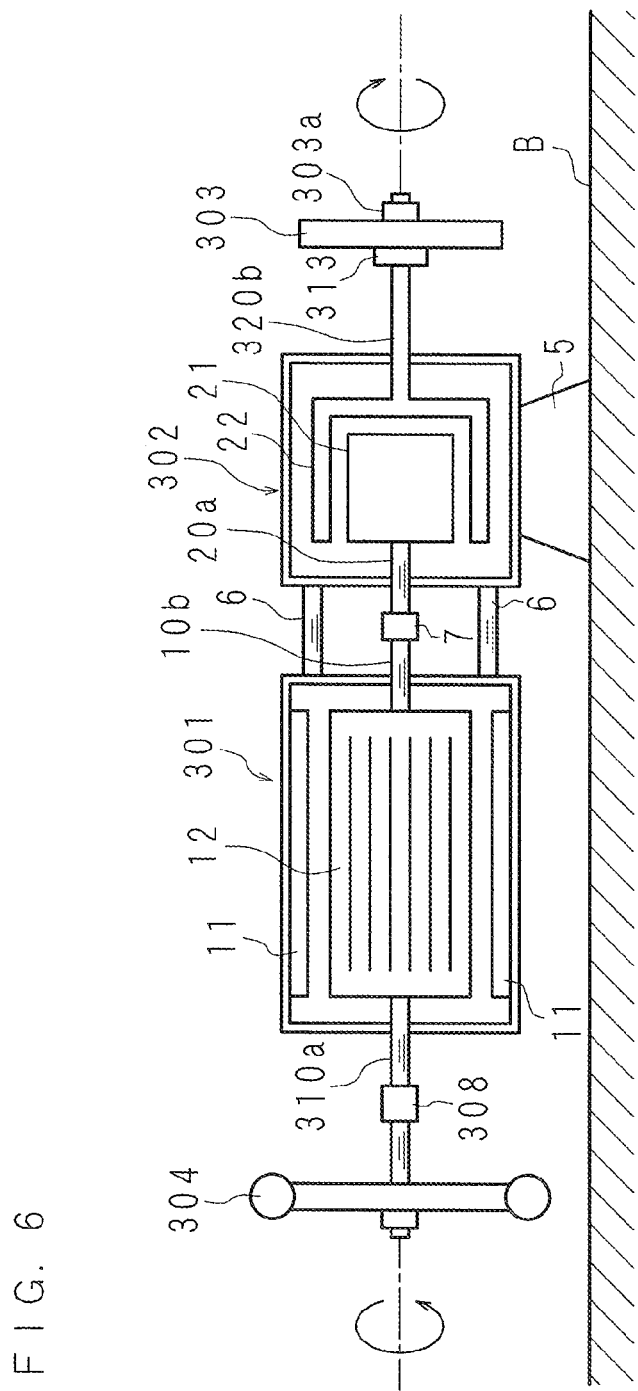
FIG. 6 is a side sectional view illustrating an example of configuration of a motor device according to variant example 3.

FIG. 6 is a side sectional view illustrating an example of configuration of a motor device according to variant example 3. In the embodiment shown in FIG. 1, an example of the dual axis motor 1 having the first rotating shaft 10a provided with the flywheel 3 and the output shaft 20b of the rotational direction converter 2 having the rotating load 4 has been explained. However, a rotating load 304 may be provided on a first rotating shaft 310a of a dual axis motor 301 via a shaft coupling 308 and a flywheel 303 may be mounted to an output shaft 320b of a rotational direction converter 302, as shown in FIG. 6. The configuration in which a flywheel mounting part 313 is provided on the output shaft 320b and the flywheel 303 is fixed by means of a bolt 303a, is similar to the above-mentioned embodiment.

Variant Example 4

Figure 7:
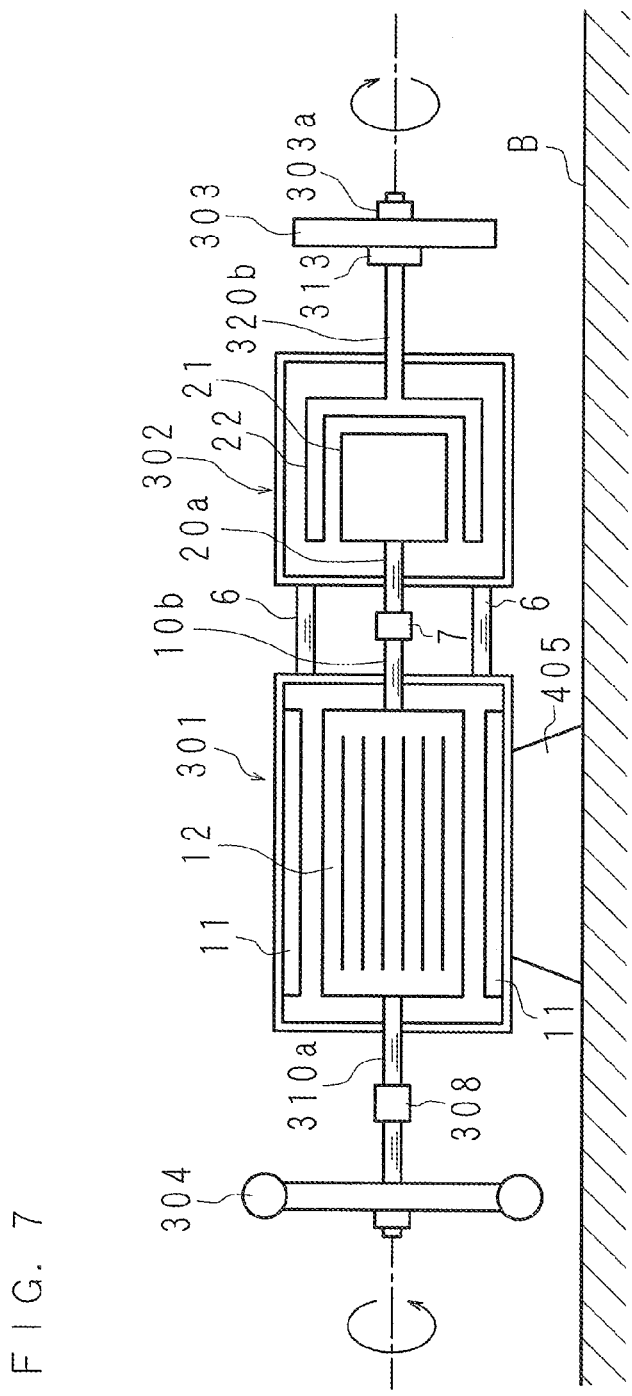
FIG. 7 is a side sectional view illustrating an example of configuration of a motor device according to variant example 4.

FIG. 7 is a side sectional view illustrating an example of configuration of a motor device according to variant example 4. In variant example 3, the fixing part 5 is provided on the rotational direction converter 302, but as shown in FIG. 7, a fixing part 405 may also be provided on the dual axis motor 301.

In the embodiments and variant examples described above, the configurations having the flywheel 3 or 303 have been explained. However, a configuration without using the flywheel 3 or 303, in which the diameter, the weight, the specific gravity and the like of the rotating portion of a motor device are appropriately adjusted so as to balance out the torque acting on the input shaft 20a side of the rotational direction converter 2 or 302 and the torque acting on the output shaft 20b or 320b side thereof, may also be possible. In addition, in a structure without using the flywheel 3 or 303, in which the rotating load 4 or 304 is provided on the output shaft 20b or 320b of the rotational direction converter 2 or 302, a single axis motor may also be possible.

The embodiments disclosed herein are merely examples in all respects and should be considered as non-limiting examples. The scope of the present invention is intended to include not only the meanings mentioned above, but also includes all the meanings equivalent to the scope of the patent application and all the variants covered thereby.

As this invention may be embodied in several forms without departing from the sprit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A motor device, comprising:
a dual axis motor having a rotating shaft projecting from both sides;
a rotational direction converter that is connected to one end side of the rotating shaft and has an input shaft to which a torque of the dual axis motor is inputted and an output shaft which outputs the torque by rotating in a direction opposite to the direction of rotation of the input shaft; and
a flywheel that is provided at the other end side of the rotating shaft or at the output shaft of the rotational direction converter and balances out a reaction torque acting on the input shaft and the output shaft of the rotational direction converter when the dual axis motor rotates.

2. The motor device according to claim 1, further comprising:
a rotating load connected to the output shaft of the rotational direction converter or to the other end side of the rotating shaft,
wherein moments of inertia of the flywheel, the dual axis motor, the rotational direction converter and the rotating load and a ratio of the numbers of rotations of the rotational direction converter satisfy an equation below:

$$Ia/Ib=\alpha$$

where,
Ia: sum of the moments of inertia on the input shaft side of the rotational direction converter,
Ib: sum of the moments of inertia on the output shaft side of the rotational direction converter, and
α: ratio of the number of rotations of the output shaft to the number of rotations of the input shaft.

3. The motor device according to claim 1, wherein the rotational direction converter has a magnetic gear mechanism that transfers the torque inputted to the input shaft to the output shaft.

4. The motor device according to claim 1, further comprising a fixing part that fixes the dual axis motor or the rotational direction converter at an external place of mounting.

5. A motor device, comprising:
a dual axis motor having a rotating shaft projecting from both sides;
a rotational direction converter that is connected to one end side of the rotating shaft and has an input shaft to which a torque of the dual axis motor is inputted and an output shaft which outputs the torque by rotating in a direction opposite to the direction of rotation of the input shaft; and
a flywheel mounting part which is provided at the other end side of the rotating shaft or at the output shaft of the rotational direction converter, and to which a flywheel balancing out a reaction torque acting on the input shaft and the output shaft of the rotational direction converter when the dual axis motor rotates, is to be mounted.

6. The motor device according to claim 5, further comprising a flywheel mounted to the flywheel mounting part.

7. The motor device according to claim 5, wherein the rotational direction converter has a magnetic gear mechanism that transfers the torque inputted to the input shaft to the output shaft.

8. The motor device according to claim 5, further comprising a fixing part that fixes the dual axis motor or the rotational direction converter at an external place of mounting.

9. A motor device, comprising:
a dual axis motor having a rotating shaft projecting from both sides;
a rotational direction converter that is connected to one end side of the rotating shaft and has an input shaft to which a torque of the dual axis motor is inputted and an output shaft which outputs the torque by rotating in a direction opposite to the direction of rotation of the input shaft; and
a rotating load connected to the output shaft of the rotational direction converter or to the other end side of the rotating shaft;
wherein moments of inertia of the dual axis motor, the rotational direction converter and the rotating load and a ratio of the numbers of rotations of the rotational direction converter satisfy an equation below:

$$Ia/Ib=\alpha$$

where,
Ia: sum of the moments of inertia on the input shaft side of the rotational direction converter,
Ib: sum of the moments of inertia on the output shaft side of the rotational direction converter, and
α: ratio of the number of rotations of the output shaft to the number of rotations of the input shaft.

10. The motor device according to claim 9, wherein the rotational direction converter has a magnetic gear mechanism that transfers the torque inputted to the input shaft to the output shaft.

11. The motor device according to claim 9, further comprising a fixing part that fixes the dual axis motor or the rotational direction converter at an external place of mounting.

12. A motor device, comprising:
a single axis motor having a rotating shaft projecting out;
a rotational direction converter that is connected to the rotating shaft and has an input shaft to which a torque of the single axis motor is inputted and an output shaft which outputs the torque by rotating in a direction opposite to the direction of rotation of the input shaft; and
a rotating load connected to the output shaft of the rotational direction converter;
wherein moments of inertia of the single axis motor, the rotational direction converter and the rotating load and a ratio of the numbers of rotations of the rotational direction converter satisfy an equation below:

$$Ia/Ib=\alpha$$

where,
Ia: sum of the moments of inertia on the input shaft side of the rotational direction converter,
Ib: sum of the moments of inertia on the output shaft side of the rotational direction converter, and
α: ratio of the number of rotations of the output shaft to the number of rotations of the input shaft.

13. The motor device according to claim 12, wherein the rotational direction converter has a magnetic gear mechanism that transfers the torque inputted to the input shaft to the output shaft.

14. The motor device according to claim 12, further comprising a fixing part that fixes the single axis motor or the rotational direction converter at an external place of mounting.

* * * * *